(12) United States Patent
Reames

(10) Patent No.: US 6,196,120 B1
(45) Date of Patent: Mar. 6, 2001

(54) STEAMER INSERT, STEAMER ASSEMBLY AND METHOD

(76) Inventor: Robert L. Reames, 11905 SW. Bowmont St., Portland, OR (US) 97225

( * ) Notice: Subject to any disclaimer, the term of this patent is extended or adjusted under 35 U.S.C. 154(b) by 0 days.

(21) Appl. No.: 09/368,914

(22) Filed: Aug. 5, 1999

(51) Int. Cl.[7] ..................................................... A47J 27/04
(52) U.S. Cl. .............................. 99/413; 99/450; 126/369
(58) Field of Search .......................... 99/413, 410, 450, 99/411, 412, 417; 126/369, 369.1, 369.2

(56) References Cited

U.S. PATENT DOCUMENTS

| | | | |
|---|---|---|---|
| 124,494 | * 3/1872 | Jones | 126/369 |
| D. 249,924 | 10/1978 | Fisher . | |
| 401,712 | * 4/1889 | Motter | 126/369 |
| 936,965 | * 10/1909 | Wells | 126/369 |
| 1,200,741 | 10/1916 | Lindgren . | |
| 1,214,992 | * 2/1917 | Boleratz | 99/412 |
| 2,932,293 | * 4/1960 | Rassieur | 126/369 |
| 3,357,342 | 12/1967 | Dreyfus . | |
| 3,427,957 | 2/1969 | O'Reilly | 99/446 |
| 3,439,603 | 4/1969 | Reames . | |
| 3,809,281 | 5/1974 | Kalkowski . | |
| 3,847,068 | 11/1974 | Beer et al. | 99/425 |
| 3,857,381 | 12/1974 | Kato . | |
| 3,908,534 | 9/1975 | Martin | 99/418 |
| 4,401,017 | 8/1983 | Feld | 99/413 |
| 4,677,905 | 7/1987 | Johnson | 99/413 |
| 4,793,324 | 12/1988 | Caferro | 126/369 |
| 5,323,693 | 6/1994 | Collard et al. | 99/425 |
| 5,740,937 | 4/1998 | Sheu | 220/23.83 |
| 5,974,953 | * 11/1999 | Messerli | 99/340 |

* cited by examiner

Primary Examiner—Reginald L. Alexander
(74) Attorney, Agent, or Firm—Klarquist Sparkman Campbell Leigh & Whinston, LLP

(57) ABSTRACT

A steamer assembly includes a steamer insert and an adapter. The steamer insert has a perforated base and a peripheral portion extending outwardly from the base. The adapter has an opening dimensioned to receive the steamer insert and support the perforated surface above the bottom of a cooking pan. The peripheral portion of the steamer insert rests upon a rim of the adapter when the steamer assembly is assembled.

21 Claims, 2 Drawing Sheets

STEAMER INSERT, STEAMER ASSEMBLY AND METHOD

FIELD

This invention relates to kitchen utensils, and in particular, to a steamer insert, a steamer assembly and related methods.

BACKGROUND

Using steam to prepare food is well known. The use of steam affords several benefits over other cooking methods, such as boiling, frying, etc., particularly because no fat (e.g., cooking oil, butter, margarine, etc.) is required in the process.

Conventional steamer inserts are designed for use in conventional saucepans having a capacity of about two quarts or greater. To use such an insert, the saucepan is first filled with an appropriate amount of water, and then the insert is placed within the saucepan. The bottom surface of the insert is maintained above the level of the water in the saucepan. In some configurations, the steamer has an outturned upper lip that engages the side of the saucepan to support the insert above the level of the water. In other configurations, the steamer insert has legs extending from its bottom surface that support the steamer above the level of the water.

Although these conventional steamer inserts are adequate for some steaming applications, e.g., steaming vegetables, they do not allow the preparer to access the food on the steamer surface easily and without injury (e.g., through burning or scalding). In particular, because conventional steamer inserts are designed with use in saucepans having a substantial depth, a preparer attempting to access food on the steaming surface must approach the steaming surface from directly above. U.S. Pat. No. 4,401,017 to Feld shows one example of a conventional steamer insert for use with a saucepan having a substantial depth.

Using a skillet as the container for the water in a steaming process has certain advantages. For one, a conventional skillet is arguably the most common kitchen utensil in modern kitchens. U.S. Pat. No. 4,677,905 to Johnson discloses a food steaming apparatus consisting of a plate that rests over the lip of a conventional skillet or, depending on the diameter of the skillet, within the skillet by engaging its inner side. The plate is perforated with specially designed holes suitable for using the plate to steam tortillas.

Because the plate is flat, however, it is difficult to maintain other foods, e.g., such as vegetables, on the steaming surface during preparation (i.e., during dispensing of the food onto the steaming surface and moving the skillet during preparation). Also, if the plate must be set down within the skillet to engage the side wall of skillet, the plate can be difficult to remove. Further, because the holes extend over the entire surface of the plate, there is no region where fully prepared food can be moved while continuing to steam other food.

Also known is a kitchen utensil or spatter guard designed to nest within and extend outward over a rim of a conventional skillet. Such a spatter guard is shown in my U.S. Pat. No. 3,439,603.

It would be desirable to provide a steamer insert and steamer assembly useful for steaming food in a conventional skillet and allowing the preparer to access and attend to the food during the steaming process. Further, it would be advantageous to provide an area on the steamer assembly that would allow the preparer to separate fully steamed food from food requiring further steaming.

SUMMARY

According to the invention, a kitchen utensil adapted for use with a cooking pan as a steamer includes an adapter and a steamer insert. The adapter has an inner periphery, an outer periphery and an intermediate region between the inner periphery and the outer periphery. The inner periphery defines an opening. The adapter is engageable with a lip of the cooking pan such that the outer periphery extends outward beyond the lip. The steamer insert is nestible within the opening in the adapter.

The steamer insert may have a perforated base. The perforated base may be spaced from a bottom of the cooking pan when the cooking pan, adapter and steamer insert are assembled together. The base may be substantially flat.

The steamer insert may have a rim, and a portion of the rim may contact the intermediate portion of the adapter when the steamer insert is inserted in the adapter. The steamer insert may have a lip extending upwardly from the rim, and an outermost portion of the lip may define an outer periphery of the steamer insert. The steamer insert may have a steaming surface on a first level and an intermediate surface on a second level above the first level.

The steamer insert may include an upwardly angled side extending from the base, an outwardly angled rim extending from the side and an upwardly angled lip extending from the rim. The side and the rim may be joined at a shoulder. The rim and the lip may also be joined at a shoulder.

The intermediate portion of the adapter may include an upwardly inclined section, and the steamer insert may include an inclined portion angled to rest against the intermediate portion when the steamer insert is inserted into the adapter. The opening in the adapter may be larger than a base of the steamer insert, such that play exists between the adapter and the steamer insert when the steamer insert is inserted into the adapter.

The adapter may be formed of aluminum. The steamer insert may be formed of steel, and preferably coated with a non-stick coating.

The inner periphery of the adapter may be shaped to fit within the rim of the cooking pan when the adapter and the cooking pan are assembled together. The inner periphery may be defined by a lower portion of an upwardly angled side, and the adapter may include an outwardly angled rim extending from the side and an upwardly angled lip extending from the rim. The side and the rim may be joined at a shoulder. The rim and the lip may also be joined at a shoulder.

According to another implementation, a steamer adapted for use with a cooking pan includes a perforated base and a peripheral portion extending outwardly from the base. The steamer is nestible in the cooking pan by resting the peripheral portion on an edge of the cooking pan. As a result, the perforated base is suspended below the upturned edge and above a bottom of the cooking pan, and the peripheral portion of the steamer extends substantially outward beyond the upturned edge.

According to still another implementation, a steamer insert suitable for use with a shallow cooking pan includes a perforated base and a solid peripheral portion extending outwardly from the perforated base, the peripheral portion having an intermediate area spaced above the perforated base.

According to yet another implementation, an easy access food steamer assembly for use with a skillet includes an adapter and a steamer insert. The adapter has an outer periphery sized larger than the skillet and an inner periphery that defines an opening. The opening is smaller than a cooking surface of the skillet. The steamer insert is coupleable with the opening in the adapter and has a perforated steaming surface. When the steamer insert is coupled to the adapter and the assembly is inserted into the skillet, the steaming surface is adjacent an upper edge of the skillet, thereby allowing access to the steaming surface.

According to a method implementation, food is prepared using steam by providing a cooking pan, an adapter and a steamer insert, inserting the adapter within a periphery of the cooking pan, inserting the steamer insert into an opening in the adapter, and heating water in the cooking pan to produce steam for preparing food on the steamer insert.

DETAILED DESCRIPTION

Figure 1:
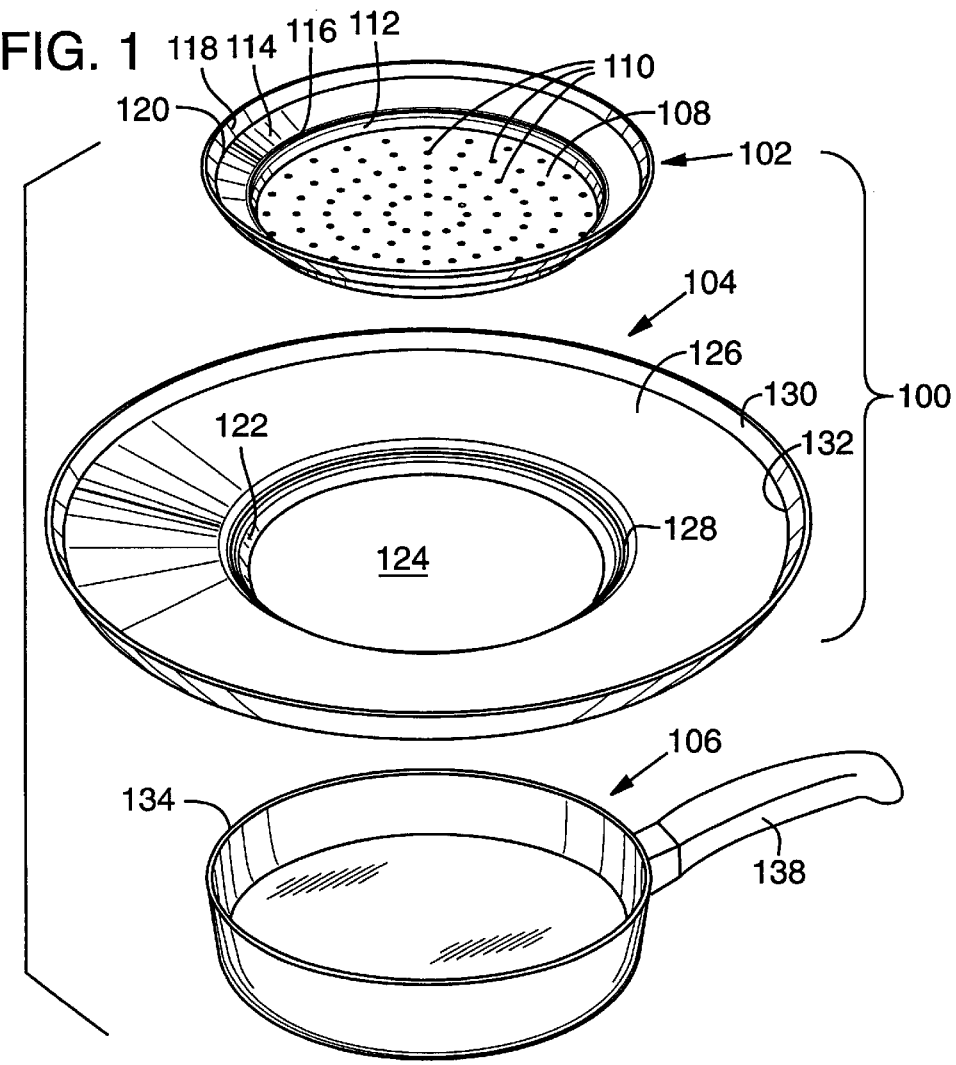
FIG. 1 is an exploded pictorial view showing a steamer insert and adapter that together comprise a steamer assembly according to the present invention in conjunction with a conventional skillet.
Figure 2:
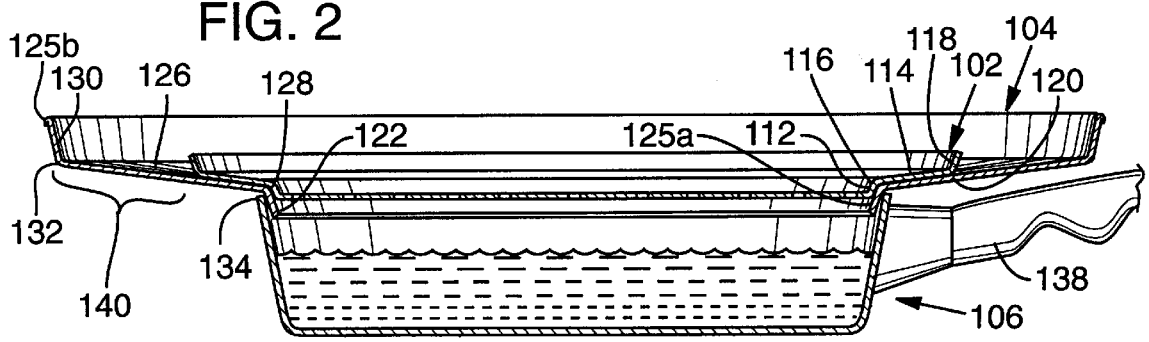
FIG. 2 is a side sectional view showing the assembled steamer assembly and skillet.

FIG. 1 shows a steamer assembly 100 according to the invention that includes a steamer insert 102 configured to nest within an adapter 104. The steamer assembly 100 is adapted for use with a conventional skillet 106 as shown in FIGS. 1 and 2.

In a specific implementation, the steamer insert 102 has a substantially circular shape and a shallow depth. The steamer insert 102 has a substantially flat steaming surface 108 that has a plurality of holes 110, and an intermediate region between the steaming surface 108 and an outermost periphery of the steamer insert 102.

In particular, an upturned side 112 extends around and upward from the steaming surface 108. The side 112 is joined to a rim 114 at a first shoulder 116. The rim 114 extends outward and slightly upward from the side 112. An outer periphery of the rim 114 is joined to a lip 118 at a second shoulder 120. The lip 118 extends upward and slightly outward from the rim 114.

In the specific implementation shown, the adapter 104 also has a substantially circular shape and a shallow depth. The adapter 104 has a side 122 that extends upward and slightly outward with an innermost periphery 125a that defines an opening 124 within which the steamer insert 102 can be inserted. The adapter has an intermediate region 125c between the innermost periphery 125a and the outermost periphery 125b.

In particular, the side 122 is joined to a rim 126 at a first shoulder 128. The rim 126 extends outward and slightly upward from the side 122. The rim 126 is jointed to a lip 130 at a second shoulder 132. The lip 130 extends upward and slightly outward from the rim 126.

As shown in FIG. 2, the steamer assembly 100 is assembled by inserting the steamer insert 102 into the adapter 104 such that the steaming surface 108 is above the opening 124. In the illustrated embodiment, the first shoulder 116 of the steamer insert 102 rests on the first shoulder 128 of the adapter 104. The steamer insert 102 can be sized to fit within the adapter 104 more loosely, however, such that the size of the opening 124 and the size of the steaming surface 108 need not be precisely matched (i.e., with play existing between the side 112 of the steamer insert 102 and the side 122 of the adapter 104). Such play can accommodate differing thermal expansions of the steamer insert 102 and the adapter 104.

As assembled, the rim 114 of the steamer insert 102 and the rim 126 of the adapter 104 contact each other. This contact assists in preventing steam from escaping. In a specific implementation, the rim 114 and the rim 126 are each inclined portions. Further, the rim 114 and rim 126 are each substantially flat, and thus there is no free path between the steamer insert 102 and the adapter 104 for steam to escape.

The steamer assembly 100 is then inserted into the skillet 106 or other suitable cooking pan. As shown, a bottom surface of the rim 126 of the adapter rests on a lip 134 of the skillet 106, and the periphery 125b of the adapter 104 extends beyond the lip 134. Also, the steaming surface 108 is positioned below the level of the lip 134. Depending upon the size of the skillet 106, the lip 134 may contact the rim 126 near the first shoulder 128 or at any point between the first shoulder 128 and the second shoulder 132. Thus, the adapter 104 can be sized to accommodate use of the steamer insert 102 with skillets or other cooking pans having a range of sizes.

The lip 118 of the steamer insert 102 projects upwardly from the rim 126 of the adapter 104, and thus may be grasped by the user to remove the steamer insert 102 from the adapter 104. Also, because the lip 118 projects upwardly, the lip 118 prevents food stored on the rim 126 between the lip 130 of the adapter 104 and the lip 118 (i.e., food in the region 140, described below) from rolling down the rim 126 and falling into the steamer insert 102.

Figure 4:
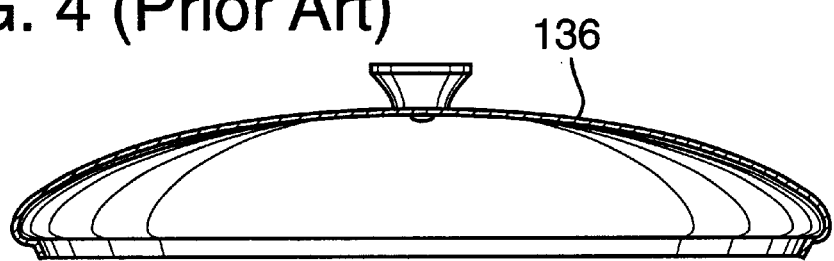
FIG. 4 is a side view of a conventional cover for the skillet that can be used to cover the steamer insert when the steamer assembly is in place in the skillet.

The steamer assembly 100 and the skillet 106 may be used in conjunction with a cover 136 (FIG. 4) in certain applications, e.g., to concentrate the effect of the steam. Any suitable cover may be used. Because the adapter 104 as shown is sized larger than the skillet, a cover larger than the skillet may be used. If the cover 136 is sized for the skillet 106, the cover 136 contacts the rim 114 of the steamer insert 102 when the cover 136 is placed over the steamer assembly 100.

Figure 3:
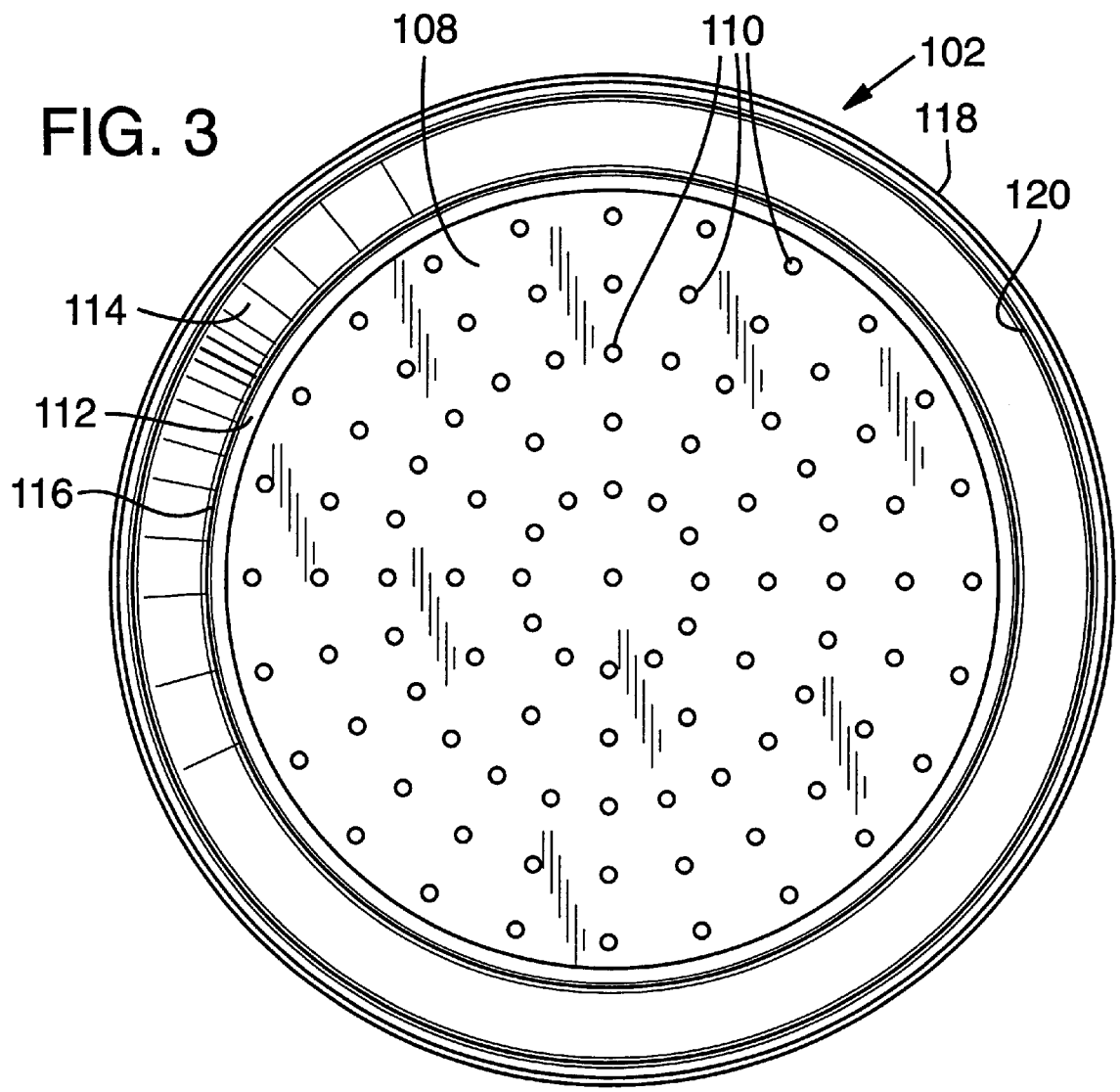
FIG. 3 is a top view of the steamer insert showing its structure and the pattern of the holes in the steaming surface.

FIG. 3 shows the pattern of the holes 110 in the steaming surface 108 of the steamer insert 102 for a specific implementation. As shown, the holes 110 are spaced apart (e.g., by about 15°) along lines extending radially from the center of the steaming surface 108. Alternatively, the holes 108 may be arranged in any other suitable pattern. In a specific implementation, the holes 110 are each stamped to about ⅛ in. in diameter.

The steamer insert 102 of a specific implementation is formed of 0.040 in. thickness steel and coated with a non-stick coating, e.g., a Teflon® coating. The adapter 104 of a specific implementation is formed of 0.040 in.–0.050 in. aluminum that is anodized to protect the surface. In a specific implementation, the side 122 of the adapter 104 has a diameter of about 9⅛ in. to about 9¼ in. Because the steamer insert 102 and the adapter 104 of the illustrated implementation are relatively thin and light, they are easy to use, clean and store.

Referring to FIG. 2, the slight upward angle of the rim 126 prevents interference between the steamer assembly 100 and a handle 138 of the skillet 106. When assembled, a region 140 is defined along the rim 126 of the adapter 104 between the lip 118 of the steamer insert 102 and the lip 130 of the adapter 104. The region 140, which is at a higher level than the steaming surface 108, can be used to store food prior to or after steaming, e.g., while steaming other food or waiting for the water to boil. During use, the region 140 reaches a sufficient temperature for keeping food warm, but is cooler than the steaming surface 108.

The steamer assembly 100 is configured such that food on the steaming surface 108 can be easily reached from the side, e.g., by using a spatula or other implement. The lips 130, 118 and rims 126, 114 of the adapter 104 and the steamer insert 102, respectively, have a low profile, thus enabling a user to approach the steaming surface 108 with a spatula from any point along a periphery 125b of the steamer assembly 100.

In operation for use as a steamer, the skillet 106 is partially filled with water and heated until the water boils. In certain application, e.g., preparing eggs, the water must first reach a full rolling boil. Steam produced by the boiling water escapes through the holes 110, thereby cooking food placed on the steaming surface 108. If necessary, the preparer can attend to food on the steaming surface 108 during preparation. The preparer can also move food between the steaming surface 108 and the region 140. In some applications, the steamer insert 102 can be used with a cooking pan alone, i.e., without the adapter 104.

In addition to conventional steaming applications, the steamer insert is also useful for other food preparation applications. These applications include, but are not limited to, restoring leftover meats and vegetables (without further dilution) and thawing frozen food.

Although the illustrated implementation of the steamer assembly 100 is intended for use with a skillet, either as shown or of the electric frying pan type, it can be used with other types of cooking pans as well, including, e.g., sauce pans, dutch ovens and stew pots.

Having illustrated and described the principles of my invention with reference to several preferred embodiments, it should be apparent to those of ordinary skill in the art that the invention may be modified in arrangement and detail without departing from such principles. I claim as my invention all such modifications that fall within the scope of the following claims.

What is claimed is:

1. A kitchen utensil adapted for use with a cooking pan as a steamer, comprising:
    an adapter having an inner periphery, an outer periphery and an intermediate region between the inner periphery and the outer periphery, the inner periphery defining an opening, the adapter being engageable with a lip of the cooking pan such that the outer periphery extends outward beyond the lip; and
    a steamer insert nestible within the opening in the adapter, the steamer insert having a perforated base, a rim and a steamer insert lip extending upwardly from the rim and defining an outer periphery of the steamer insert, wherein at least a portion of the rim contacts the intermediate region of the adapter when the steamer insert is inserted in the adapter.

2. The kitchen utensil of claim 1, wherein the perforated base is spaced from a bottom of the cooking pan when the cooking pan, adapter and steamer insert are assembled together.

3. The kitchen utensil of claim 1, wherein the base is substantially flat.

4. The kitchen utensil of claim 1, wherein the intermediate portion of the adapter includes an inclined section, and wherein the rim of the steamer insert includes an inclined portion angled to rest against the intermediate portion when the steamer insert is inserted into the adapter.

5. The kitchen utensil of claim 1, wherein the adapter is formed of aluminum.

6. The kitchen utensil of claim 1, wherein the steamer insert is formed of steel.

7. The kitchen utensil of claim 1, wherein the opening in the adapter is larger than a base of the steamer insert such that play exists between the adapter and the steamer insert when the steamer insert is inserted into the adapter.

8. The kitchen utensil of claim 1, wherein the inner periphery of the adapter is shaped to fit within the rim of the cooking pan when the adapter and the cooking pan are assembled together.

9. The kitchen utensil of claim 1, wherein the inner periphery is defined by a lower portion of an upwardly angled side, and the adapter includes an outwardly angled rim extending from the side and an upwardly angled lip extending from the rim.

10. The kitchen utensil of claim 9, wherein the side and the rim are joined at a shoulder.

11. The kitchen utensil of claim 10, wherein the shoulder is a first shoulder, and wherein the rim and the lip are joined at a second shoulder.

12. A kitchen utensil adapted for use with a cooking pan as a steamer, comprising:
    an adapter having an inner periphery, an outer periphery and an intermediate region between the inner periphery and the outer periphery, the inner periphery defining an opening, the adapter being engageable with a lip of the cooking pan such that the outer periphery extends outward beyond the lip; and
    a steamer insert nestible within the opening in the adapter wherein the steamer insert includes a perforated base, an upwardly angled side extending from the base, an outwardly angled rim extending from the side, and an upwardly angled lip extending from the rim.

13. The kitchen utensil of claim 12, wherein the side and the rim are joined at a shoulder.

14. The kitchen utensil of claim 13, wherein the shoulder is a first shoulder, and wherein the rim and the lip are joined at a second shoulder.

15. A kitchen utensil adapted for use with a cooking pan as a steamer, comprising:
    an adapter having an inner periphery, an outer periphery and an intermediate region between the inner periphery and the outer periphery, the inner periphery defining an opening, the adapter being engageable with a lip of the cooking pan such that the outer periphery extends outward beyond the lip; and
    a steamer insert nestible within the opening in the adapter, the steamer insert having a perforated steaming surface on a first level and an intermediate surface on a second level higher than the first level.

16. The kitchen utensil of claim 15, wherein the perforated steaming surface is spaced from a bottom of the cooking pan when the cooking pan, adapter and steamer insert are assembled together.

17. The kitchen utensil of claim 15, wherein the steamer insert includes a rim between the steaming surface and the intermediate surface, and wherein the rim contacts the intermediate region of the adapter when the steamer insert is inserted in the adapter.

18. The kitchen utensil of claim 17, wherein the steamer insert includes a lip extending upwardly from the rim, and an outermost portion of the lip defines an outer periphery of the steamer insert.

19. The kitchen utensil of claim 15, wherein the steaming surface is substantially flat.

20. The kitchen utensil of claim 15, wherein the opening of the adapter is larger than the steaming surface of the steamer insert such that play exists between the adapter and the steamer insert when the steamer insert is inserted into the adapter.

21. The kitchen utensil of claim 15, wherein the intermediate portion of the adapter includes an inclined section, and wherein the steamer insert includes an inclined portion angled to rest against the intermediate portion when the steamer insert is inserted into the adapter.

* * * * *